US006731330B2

(12) United States Patent
Lin

(10) Patent No.: US 6,731,330 B2
(45) Date of Patent: May 4, 2004

(54) METHOD FOR ROBUST DETERMINATION OF VISIBLE POINTS OF A CONTROLLABLE DISPLAY WITHIN A CAMERA VIEW

(75) Inventor: I-Jong Lin, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 387 days.

(21) Appl. No.: 09/774,452

(22) Filed: Jan. 30, 2001

(65) Prior Publication Data

US 2002/0126136 A1 Sep. 12, 2002

(51) Int. Cl.[7] .............................. H04N 7/18; H04N 9/47
(52) U.S. Cl. ..................... 348/135; 345/157; 345/156
(58) Field of Search ................. 345/156, 157; 348/135

(56) References Cited

U.S. PATENT DOCUMENTS 5,528,263 A * 6/1996 Platzker et al. ............. 345/156
5,729,252 A * 3/1998 Fraser ....................... 715/500.1
5,973,672 A * 10/1999 Rice et al. .................. 345/158
6,075,895 A 6/2000 Qiao
6,292,171 B1 * 9/2001 Fu et al. ..................... 345/156
6,346,933 B1 * 2/2002 Lin ............................ 345/157
6,486,894 B1 * 11/2002 Abdelhadi et al. .......... 345/765
6,512,507 B1 * 1/2003 Furihata et al. ............. 345/157

FOREIGN PATENT DOCUMENTS

EP 0718748 A2 6/1996

* cited by examiner

Primary Examiner—Andy Rao
Assistant Examiner—Charles E Parsons

(57) ABSTRACT

A system and method of locating the display area of a user interactive, computer controlled display including a computing device for generating image data corresponding to a plurality of selected images, a display area for displaying the plurality of selected images, an image capture device for capturing a plurality of images within its capture area each captured image including one of the selected images and a display area locator for locating the display area within the capture area by deriving constructive and destructive feedback data from image data corresponding to the plurality of captured images.

18 Claims, 6 Drawing Sheets

METHOD FOR ROBUST DETERMINATION OF VISIBLE POINTS OF A CONTROLLABLE DISPLAY WITHIN A CAMERA VIEW

FIELD OF THE INVENTION

The present invention relates to a computer controllable display system and in particular to the interaction of a user with a computer controlled image display or projected image.

BACKGROUND OF THE INVENTION

Computer controlled projection systems generally include a computer system for generating image data and a projector for projecting the image data onto a projection screen. Typically, the computer controlled projection system is used to allow a presenter to project presentations that were created with the computer system onto a larger screen so that more than one viewer can easily see the presentation. Often, the presenter interacts with the projected image by pointing to notable areas on the projected image with their finger, laser pointer, or some other pointing.

The problem with this type of system is that if a user wants to cause any change to the projected image they must interact with the computer system using an input device such as a mouse, keyboard or remote device. For instance, a device is often employed by a presenter to remotely control the computer system via infrared signals to display the next slide in a presentation. However, this can be distracting to the viewers of the presentation since the presenter is no longer interacting with them and the projected presentation and, instead, is interacting with the computer system. Often, this interaction can lead to significant interruptions in the presentation.

Hence, a variation of the above system developed to overcome the computer-only interaction problem allows the presenter to directly interact with the projected image. In this system, the computer system generates image data (e.g. presentation slides) to be projected onto a screen (e.g. projection screen) with an image projector device. The system also includes a digital image capture device such as a digital camera for capturing the projected image. The captured projected image data is transmitted back to the computing system and is used to determine the location of the an object in front of the screen such as a pointing device. The computer system may then be controlled dependent on the determined location of the pointing device. For instance, in U.S. Pat. No. 5,138,304 assigned to the assignee of the subject application, a light beam is projected onto the screen and is detected by a camera. To determine the position of the light beam, the captured image data of the projected image and the original image data are compared to determine the pointer position. The computer is then caused to position a cursor in the video image at the pointer position or is caused to modify the projected image data in response to the pointer position.

In order to implement a user interactive, computer controlled display or projection system, an initial calibration step is necessary where the computer system determines the location of the screen or more specifically the area in which the image is displayed within the capture area of the camera. By determining the location of the display area within the capture area, the system can then identify any object that is not part of the displayed image (e.g., objects in front of the displayed image). In one prior art system, the location of the display area within the capture area is determined by using complex, and sometimes fragile, pattern matching algorithms requiring a significant amount of computing time and system memory usage.

The present invention is an efficient, robust, and simple technique for locating an image display area within the capture area of an image capture device in a user interactive, computer controlled display or projection system.

SUMMARY OF THE INVENTION

A system for locating an user interactive, computer controlled image display area includes a display area for displaying a plurality of selected digital images, a computing system for providing digital image data for causing the plurality of selected digital images to be displayed, an image capture device having an image capture area for capturing a plurality of images within the capture area each including one of the selected digital images, and a display area locator including a means for deriving constructive or destructive feedback data from digital image data corresponding to the plurality of captured images to determine the location of the display area within the image capture area.

The method for determining the location of the user interactive, computer controlled display area within an image capture area of an image capture device is performed by displaying a plurality of selected images in the display area, capturing a plurality of images within the capture area each including one of the plurality of selected images, and deriving constructive or destructive image feedback data from the image data corresponding to the plurality of captured images in order to locate the display screen in the image capture area of the image capture device.

DETAILED DESCRIPTION OF THE INVENTION

Figure 1:
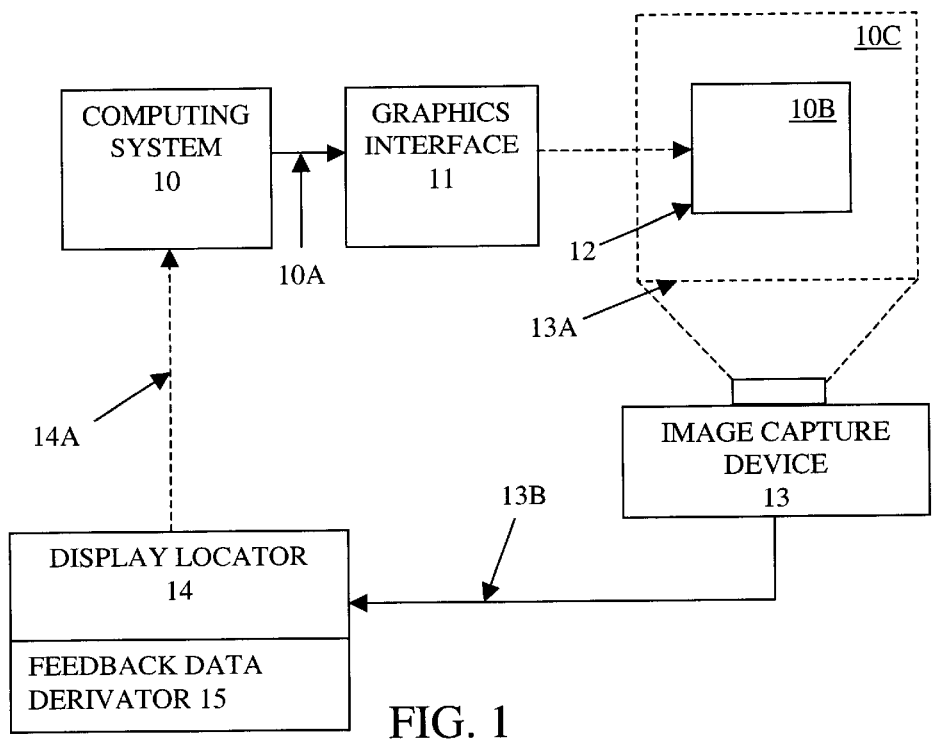
FIG. 1 illustrates a block diagram of a first embodiment of a system for locating a display area in a user interactive, computer controlled display system.

FIG. 1 shows a block diagram of an interactive computer controlled image display system which includes a computing system 10 for generating image data 10A and a graphical interface 11 for causing selected images 10B corresponding to the image data 10A to be displayed in display area 12. It should be understood that the graphical interface may be a portion of the computing system or may be a distinct element external to the computing system. The system further includes an image capture device 13 having an associated image capture area 13A for capturing a plurality of images each including one of the plurality of selected displayed images 10B. The captured images also include images 10C that are not within the display area. Non-display area images include anything other than what is being displayed within the display area. The plurality of captured images is converted into digital image data 13B which is transmitted to a display area locator 14. Display locator 14 includes a means for deriving constructive and destructive image feedback data 15 from the captured image data 13B to determine the location of the display area 12 within the image capture area 13A. The display locator can then optionally transmit the screen location information 14A to the computing system 10 for use in the user interactive, computer controlled display system.

In this embodiment, the computing system includes at least a central processing unit (CPU) and a memory for storing digital data (e.g., image data) and has the capability of generating at least three levels of grayscale images. The display area can be a computer monitor driven by the graphical interface or can be an area on a projection screen or projection area (e.g., a wall). In the case in which images are displayed using projection, the system includes an image projector (not shown in FIG. 1) that is responsive to image data provided from the graphical interface.

In one embodiment, the image capture device is a digital camera arranged so as to capture at least all of the images 10B displayed in the display area 12 within a known time delay. It is well known in the field of digital image capture that an image is captured by a digital camera using an array of sensors that detect the intensity of the light impinging on the sensors within the capture area of the camera. The light intensity signals are then converted into digital image data corresponding to the captured image. Hence, the captured image data 13B is digital image data corresponding to the captured image. In another embodiment the image capture device can be a digital video camera capable of capturing still images of the display area.

In one embodiment, the selected images 10B are a plurality of single intensity grayscale images that are successively displayed in the display area and captured by the image capture device.

It should be understood that all or a portion of the functions of the display locator 14 can be performed by the computing system. Consequently, although it is shown external to the computing system, all or portions of the display locator 14 may be implemented within the computing system.

It should be further understood that the display locator can be implemented in a software implementation, hardware implementation, or any combination of software and hardware implementations.

Figure 2:
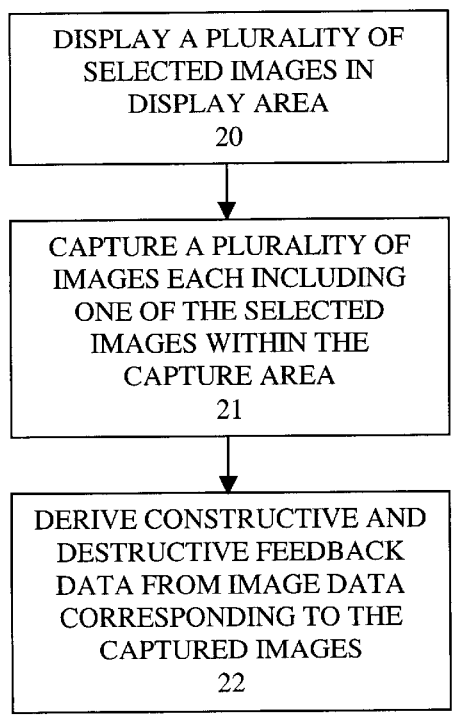
FIG. 2 illustrates a first embodiment of the method of locating a display area within a capture area in a user interactive, computer controlled display system in accordance with the present invention.

FIG. 2 shows a first embodiment of a method of determining the location of the display area within the capture area of an image capture device in an user interactive, computer controlled display system. According to this embodiment, a plurality of selected images is displayed within a display area (block 20). A plurality of images is captured within the capture area of an image capture device each captured image including one of the selected images (block 21). Constructive and destructive feedback data is derived from image data corresponding to the captured images to locate the display area within the capture area (block 22).

Figure 3:
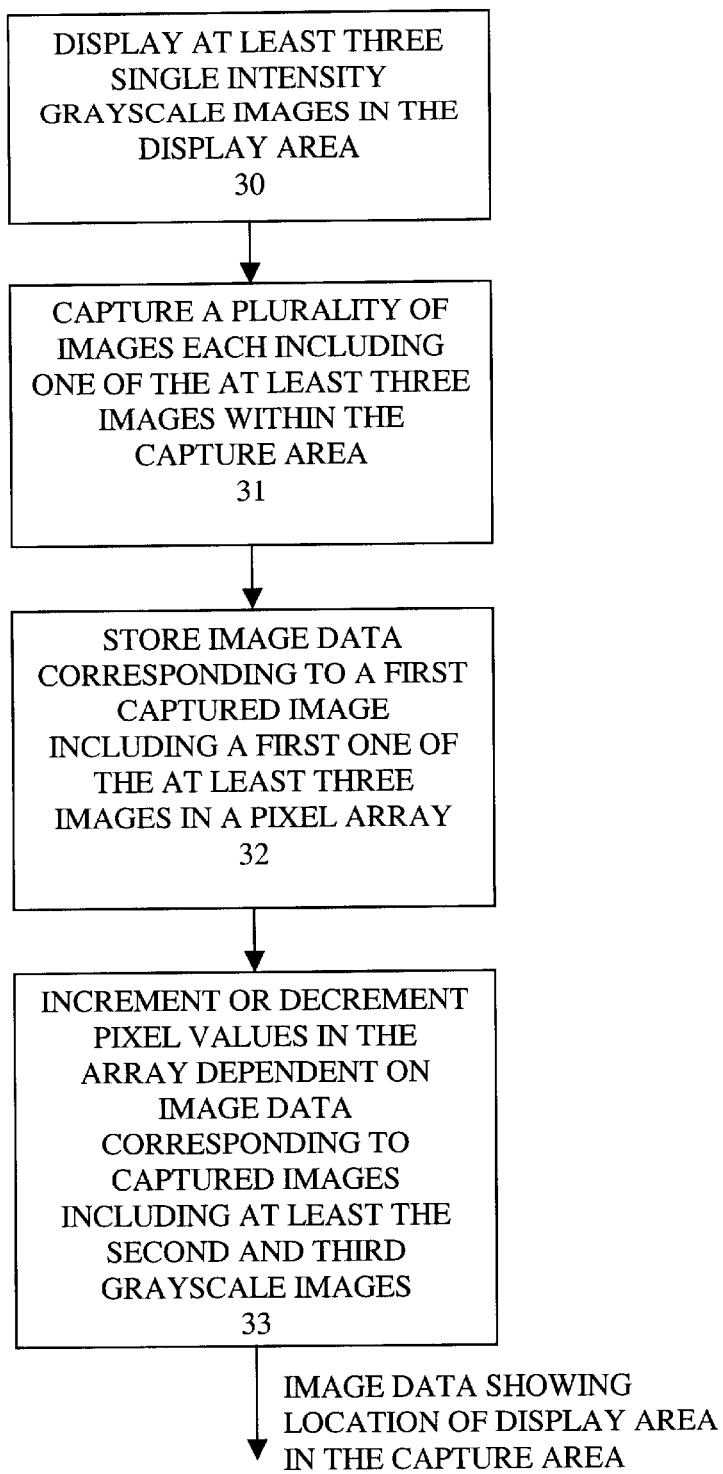
FIG. 3 illustrates a second embodiment of the method of locating a display area within a capture area in a user interactive, computer controlled display system in accordance with the present invention.

FIG. 3 shows a second embodiment of a method of determining the location of the display area within the capture area of an image capture device in an user interactive, computer controlled display system. In this method, at least three single intensity grayscale images are displayed within the display area (block 30). A plurality of images are captured within the capture area of the image capture device each including one of the, at least three, single intensity grayscale images (block 31). Constructive or destructive feedback data is derived by storing image data corresponding to a first captured image including a first one of the, at least three, images in a pixel array (block 32) and by incrementing or decrementing the pixel values dependent on the image data corresponding to the remainder of the captured images including at least the second and third single intensity grayscale images (block 33). As shown, block 33 generates image data showing the location of the display area within the capture area. It should be understood that constructive feedback infers that a given pixel value is incremented and destructive feedback infers that a given pixel value is decremented. In one embodiment, pixel values within the array that correspond to the display area are incremented by a first predetermined constant value and pixel values within the array that correspond to the non-display area are decremented by a second predetermined constant value. In one variation of the third embodiment, the feedback can be applied iteratively. This iterative process is achieved by redisplaying at least second and third images and again incrementing or decrementing pixel values in the array.

Figure 4A:
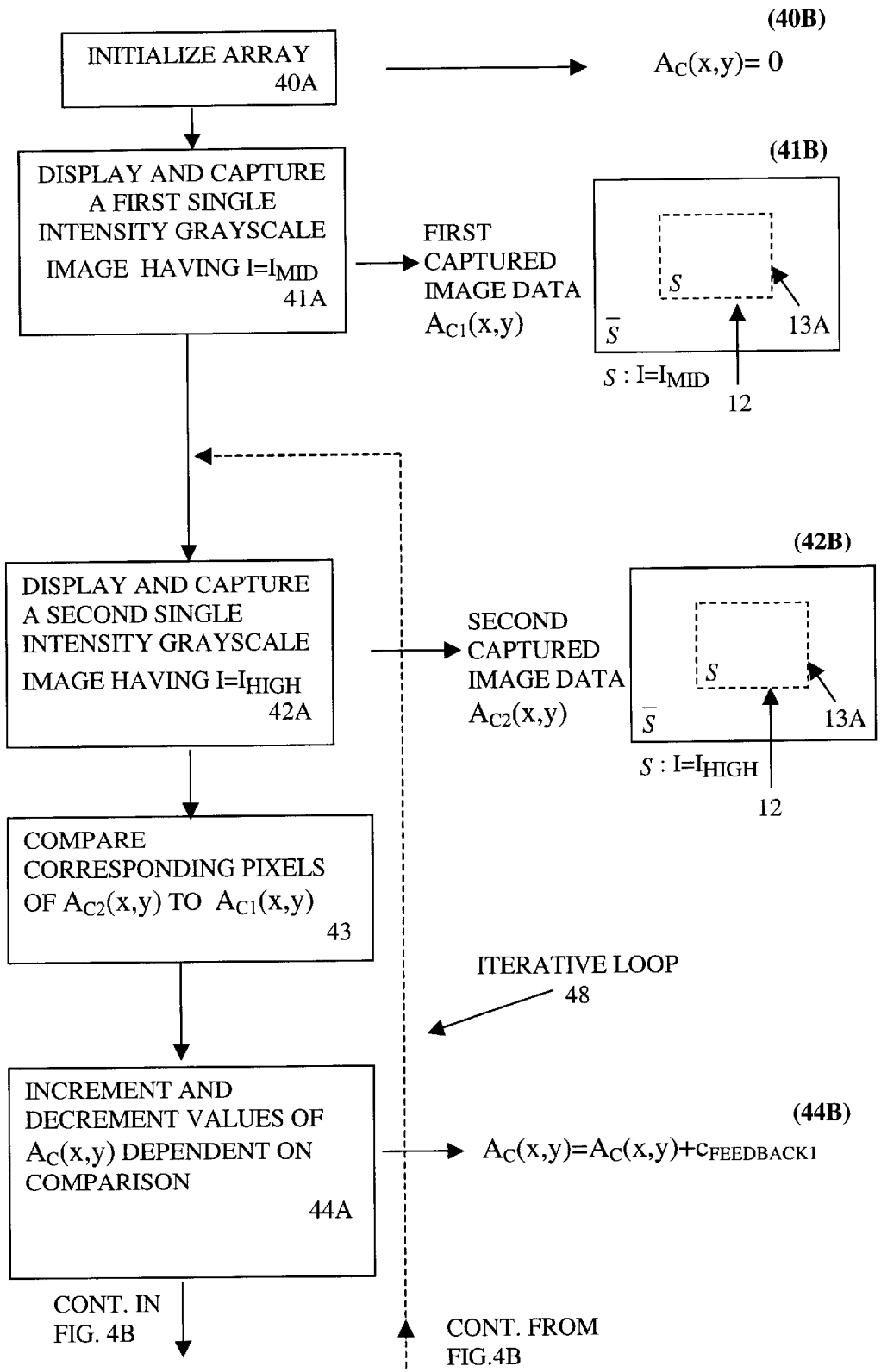
FIGS. 4A and 4B illustrate a third embodiment of the method of locating a display area within a capture area in a user interactive, computer controlled display system in accordance with the present invention.
Figure 4B:
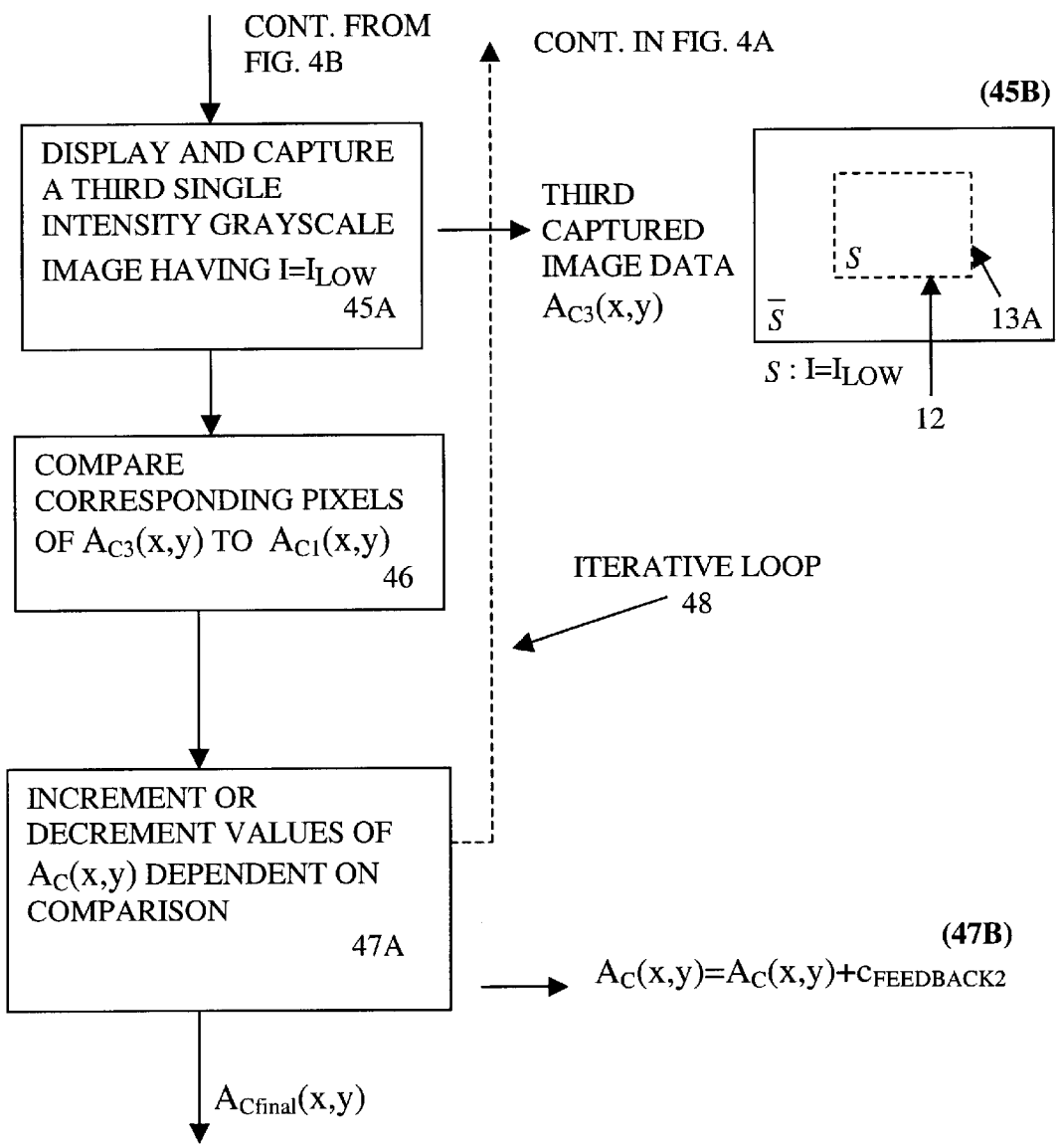

FIG. 4A shows a third embodiment of a method of the present invention and FIG. 4B illustrates corresponding operations performed by the method. Initially, an array $A_c(x,y)$ of digital storage is initialized within a digital memory storage area wherein each element within the array stores a value corresponding to each pixel location within the image capture area of the capture device. The initialization of the array sets all values within the array to zero such that $A_c(x,y)=0$ (block 40A and 40B).

A first single intensity grayscale image having an intensity of $I_{mid}$ (where $I_{HIGH} > I_{mid} > I_{LOW}$) is displayed in the display area 12 and a first image is captured within image capture area 13A having a corresponding array of image data $A_{c1}(x,y)$ (block 41A and 41B). The first captured image includes a first single grayscale image displayed in display 12. Specifically, as shown by 41B the first captured image includes an area of pixels s that corresponds to the display area 12 all having an intensity of $I_{mid}$ and an area of pixels $\bar{s}$ that corresponds to the non-display area. Array $A_{c1}(x,y)$ is also stored.

Next, a second single intensity grayscale image is displayed in display area 12 having a maximum intensity level of $I_{HIGH}$ and a second image is captured within the image capture area having a corresponding image data array $A_{c2}(x,y)$ (block 42A). The array $A_{c2}(x,y)$ includes pixels s having intensities of $I_{HIGH}$ and non-display area pixels $\bar{s}$ (block 42B). The pixel values of array $A_{c1}(x,y)$ are compared with corresponding pixel values of $A_{c2}(x,y)$ (block 43) and the values of $A_c(x,y)$ are incremented or decremented (block 44A) according to the following conditions:

if $A_{c2}(x,y) > A_{c1}(x,y)$, then $A_c(x,y)=A_c(x,y)+c_{pos}$;  condition 1 otherwise $A_c(x,y)=A_c(x,y)+c_{neg}$;  condition 2 where $c_{neg}$ is a negative integer and $c_{pos}$, is a positive integer. In one embodiment, $c_{pos}=20$ and $c_{neg}=-16$. Restated, $A_c(x,y)=A_c(x,y)+c_{feedback1}$.

It should be noted that the value of $A_c(x,y)$ is dependent on the dynamic behavior of corresponding pixel values from the first captured image to the third captured image in the display and non-display areas. Consequently, since the intensity level of the display area pixels s in the second captured image (42B) is $I_{HIGH}$ and since the intensity level of the display area pixels s in the first captured image (41B) is $I_{mid}$, then $A_{c2}(x,y) > A_c(x,y)$ in the display area s. As a result, condition 1 applies and $c_{pos}$ is added to all values corresponding to the display area in array $A_c(x,y)$. Since $A_c(x,y)$ is initialized such that all values are set to 0 prior to block 44A, then the values corresponding to s in array $A_c(x,y)$ are incremented to a value of $c_{pos}$ after the first feedback data is applied.

Alternatively, assuming the background of the display area does not change, the intensity of the non-display area pixels $\bar{s}$ will be the same and $A_{c2}(x,y)=A_{c1}(x,y)$. Consequently, condition 2 applies and $C_{neg}$ is added to the values corresponding to non-display pixels in array $A_c(x,y)$. However, in some cases, condition 2 may apply due to image noise or if the background changes. Consequently, values of $A_c$ corresponding to non-display area $\bar{s}$ will range in value from $(C_{pos}) \rightarrow (c_{neg})$.

Hence, constructive feedback is applied to all values corresponding to the display area in array $A_c(x,y)$ and, for the most part, destructive feedback is applied to values corresponding to non-display area in array $A_c(x,y)$. As a result, display area values are driven positively and non-display area values are driven in negatively.

Next, a third single intensity grayscale image having an intensity level of $I_{LOW}$ is displayed in display area 12 and a third image is captured in capture area 13A having a corresponding array of image data $A_{c3}(x,y)$ (block 45A and 45B). As shown the pixel array $A_{c3}(x,y)$ includes pixels s having intensities of $I_{LOW}$ and pixels $\bar{s}$ (45B). The pixel values of array $A_{c1}(x,y)$ are then compared with corresponding pixel values of $A_{c3}(x,y)$ (block 46) and the values of $A_c(x,y)$ are incremented or decremented (block 47A) according to the following conditions:

if $A_{c3}(x,y) < A_{c1}(x,y)$ then $A_c(x,y)=A_c(x,y)+c_{pos}$;  condition 3 otherwise $A_c(x,y)=A_c(x,y)+C_{neg}$.  condition 4

Restated, $A_c(x,y)=A_c(x,y)+c_{feedback2}$. Note conditions 3 and 4 are essentially the inverse of conditions 1 and 2. As a result, since the intensity of the display area pixels s in the third captured image data (45B) is $I_{LOW}$ and since the intensity of the display area pixels s in $A_{c1}(x,y)$ is $I_{mid}$, then $A_{c3}(x,y) < A_{c1}(x,y)$ in display area s. As a result, condition 3 applies and $c_{pos}$ is once again added to all values corresponding to the display area s in array $A_c(x,y)$. Hence, constructive feedback is applied to the display area values in array $A_c(x,y)$ when applying both of the first and second feedback data.

In contrast, assuming again that the non-display pixel values in the third captured image data 45B still have not changed then, in most cases condition 4 applies and $c_{neg}$ is once again added to non-display values in $A_c(x,y)$. In the case in which the non-display area image has changed or due to noise, condition 3 may apply. However, destructive feedback, for the most part, is applied to the non-display area values in array $A_c(x,y)$ when applying both of the first and second feedback data.

The net effect of feedback blocks 44A and 47A is that the values in $A_c(x,y)$ corresponding to the display area s are driven positively while the values of the non-display area $\bar{s}$ are driven negatively. FIG. 4A also shows that an iterative loop 48 can be performed such that for each of the second and third captured images additional feedback is added to $A_c(x,y)$ such that if i is the number of iterations in the loop 48, then:

$$A_{cfinal} = \lim_{i \to \infty} A_c(x,y) = \begin{cases} \text{if } (x,y) \in s, \infty \\ \text{if } (x,y) \in \bar{s}, -\infty \end{cases}$$

The resulting array $A_{cfinal}(x,y)$ will comprise very positive values in pixel locations corresponding to the display area and very negative values in pixel locations corresponding to non-display areas. Hence, a threshold comparison can be used to identify extremely positive/negative values and hence can be used to identify the location of the display area within the capture area of the image capture device.

Figure 5A:
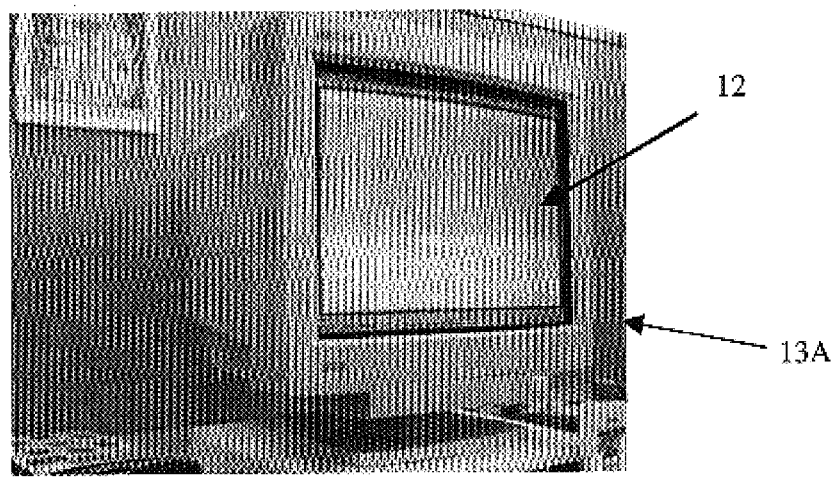
FIG. 5A shows an exemplary image of a display area in a capture area.
Figure 5B:
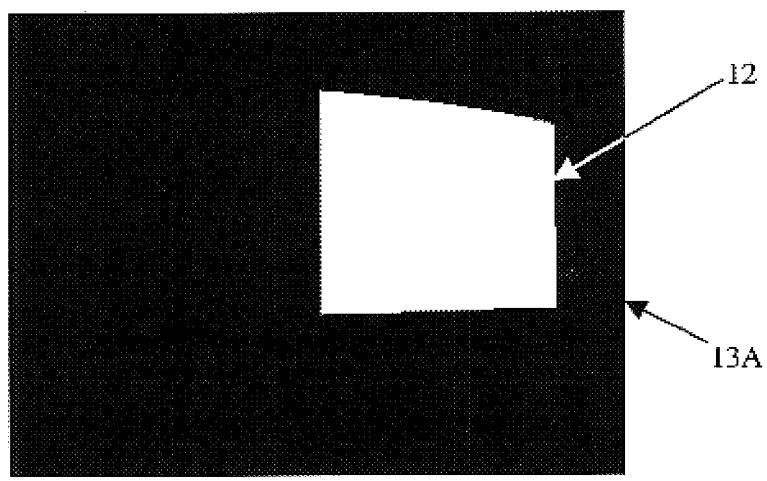
FIG. 5B shows an image corresponding to image data obtained by performing the method of the present invention.

FIG. 5A illustrates an exemplary image of a display area 12 captured within a capture area 13A. In particular, the display area 12 is a computer monitor. FIG. 5B represents the data (i.e., $A_{cfinal}(x,y)$) providing the location information of the display area 12. As can be seen, the display area 12 is white corresponding to pixel values having a maximum intensity level of $I_{HIGH}$ and the non-display area surrounding the display area within the capture area 13A is black corresponding to pixel values having a minimum intensity level of $I_{LOW}$.

Figure 6A:
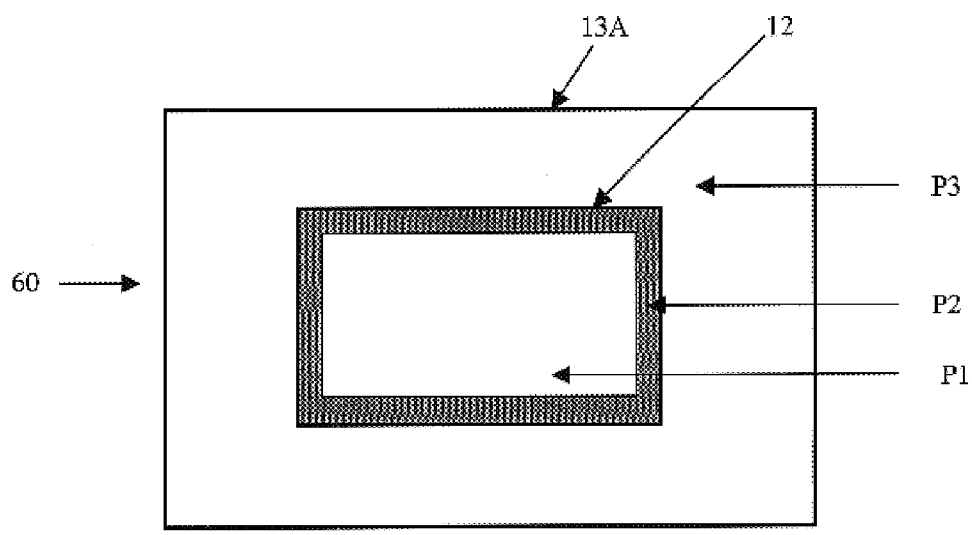
FIGS. 6A and 6B illustrate selected images for displaying in a fourth embodiment of the method of locating a display area within a capture area in a user interactive, computer controlled display system in accordance with the present invention.
Figure 6B:
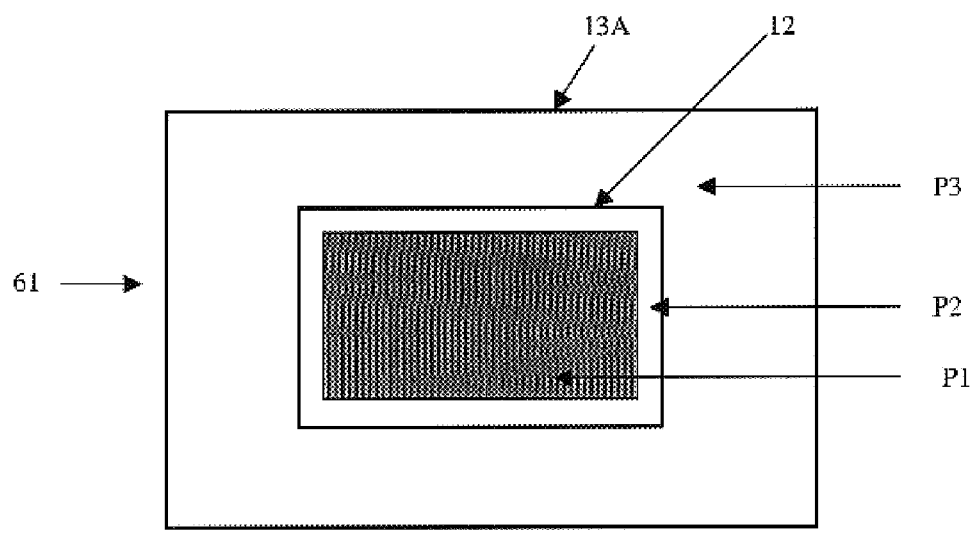

In a fourth embodiment of the method of the present invention, the second and third images are not displayed with a single grayscale intensity. Instead, the second image is displayed such that a first region of the image is displayed to have a first intensity value and a second region is displayed to have second intensity value while the third image is displayed to have the converse intensities in corresponding regions. For instance, FIGS. 6A and 6B show display area 12 within the capture area 13A, and the manner in which the second and third images are displayed for the fourth embodiment of the method of the present invention. As shown in FIG. 6A, the second image 60 is displayed within display area 12 such that a region $P_1$ of the display area 12 is set to a grayscale intensity value corresponding to $I_{HIGH}$ (i.e., white) and the other region $P_2$ is set to a grayscale value corresponding to $I_{LOW}$ (i.e., black). It should be noted that region $P_2$ essentially frames the display area 12. Region $P_3$ corresponds to the non-display area. Conversely, the third image 61 shown in FIG. 6B is displayed such that region $P_1$ is a set to a grayscale intensity value corresponding to $I_{LOW}$ and region $P_2$ is set to a grayscale intensity value corresponding to $I_{HIGH}$.

The effect of displaying the second and third images as shown in FIGS. 6A and 6B is to obtain final array data $A_{cfinal}(x,y)$ that identifies the location of a display area in the capture area as the display area region $P_1$ with a non-fuzzy or "clean" border around it. In particular, by using the method as shown in FIGS. 4A and 4B and displaying the second and third images as shown in FIGS. 6A and 6B, the display area $P_1$ is driven positively, the non-display screen area $P_3$ is driven negatively, and the display area border $P_2$ is driven even more negatively than the non-display screen area such that a sharper border is established about display area $P_1$.

The second, third and fourth embodiments can be implemented such that array $A_c(x,y)$ is normalized prior to iteratively applying the first and second feedback (blocks 43A–48A). Normalization is performed by subtracting a static constant value from all pixel values in the array as follows:

$$A_c(x,y)=A_c(x,y)-c_{static} \qquad \text{eq. 1}$$

This normalization is performed so as to better discriminate between regions that have constructive feedback and those that do not. In other words, normalization is performed to make the iterative feedback more effective in providing optimized final array data for identifying display and non-display areas.

In another embodiment, the system and method can be implemented such that instead of applying constructive feedback to display area values and destructive feedback to non-display area values in array $A_c(x,y)$, the inverse feedback conditions apply. Specifically, destructive feedback is applied to the display area values while constructive feedback is applied to non-display area values in order to identify the non-display area within the capture area of the image capture device.

In still another embodiment, the system and method can be implemented such that instead of comparing the pixel values of the stored first image to corresponding pixel values of the second and third captured image data (FIGS. 4A and 4B, blocks 43 and 46), first captured image pixel values are compared to noise adjusted second and third captured image pixel values, where noise adjusted pixel values are the original pixel value plus a noise factor value, $C_{nf}$. For instance, conditions 1 and 3 become the following:

if $A_{c2}(x,y)+c_{nf}>A_{c1}(x,y)$, then $A_c(x,y)=A_c(x,y)+c_{pos}$;  condition 1' if $A_{c3}(x,y)+c_{nf}<A_{c1}(x,y)$ then $A_c(x,y)=A_c(x,y)+c_{pos}$;  condition 3' where $c_{nf}$ is a constant value that takes into account minor fluctuations in pixel values within the user interactive, computer controlled display system due to lighting conditions, camera quality, and the quality and type of displayed image. The addition of the noise factor results in a more robust implementation of the system and method of the present invention.

Hence, a system and method is described that provides an arithmetically non-complex solution to finding the display area within the capture area of an image capture device in a user interactive, computer controlled display system.

In the preceding description, numerous specific details are set forth, such as feedback constants, intensity values, and image types in order to provide a through understanding of the present invention. It will be apparent, however, to one skilled in the art that these specific details need not be employed to practice the present invention. In other instances, well-known image processing techniques have not been described in detail in order to avoid unnecessarily obscuring the present invention.

In addition, although elements of the present invention have been described in conjunction with certain embodiments, it is appreciated that the invention can be implement in a variety of other ways. Consequently, it is to be understood that the particular embodiments shown and described by way of illustration is in no way intended to be considered limiting. Reference to the details of these embodiments is not intended to limit the scope of the claims which themselves recited only those features regarded as essential to the invention.

I claim:

1. A method for determining the location of a computer controlled display area within an image capture area of an image capture device:
displaying a plurality of selected images within the display area;
capturing a plurality of images within the capture area of the image capture device each including one of the displayed selected images; and
deriving constructive and destructive feedback data from image data corresponding to the plurality of captured images;
wherein displaying the plurality of selected images comprises displaying at least three images including, a first selected image having a first single intensity grayscale value $I_1$, displaying a second selected image having a second single intensity grayscale value $I_2$ and displaying a third selected image having a third single intensity grayscale value $I_3$, wherein $I_1>I_2>I_3$.

2. The method as described in claim 1 wherein the second single intensity grayscale value corresponds to one of a maximum intensity level and a minimum intensity level, the third single intensity grayscale value corresponds to the other of the maximum intensity level and the minimum intensity level, and the first single intensity grayscale value is a value between the maximum and minimum intensity values.

3. The method as described in claim 1 wherein displaying a plurality of selected images comprises displaying each of the second selected and the third selected images such that first regions have a corresponding intensity value $I_2$ and second regions have a corresponding intensity value $I_3$.

4. The method as described in claim 1 wherein deriving constructive and destructive feedback data from the image data comprises:
storing the image data corresponding to a first captured image of the plurality of captured images which includes the first selected image in a pixel array associated with the capture area; and
one of incrementing and decrementing pixel values in the pixel array dependent on the image data corresponding to a second captured image of the plurality of captured images including the second selected image and dependent on the image data corresponding to a third captured image of the plurality of captured images including the third selected image.

5. The method as described in claim 4 wherein the pixel values are incremented by a first predetermined constant value and the pixel values are decremented by a second predetermined constant value.

6. The method as described in claim 4 wherein pixel values corresponding to the display area within the capture area are incremented so as to create the constructive feedback data and pixel values not corresponding to the display area are decremented so as to create the destructive feedback data.

7. The method as described in claim 4 wherein incrementing and decrementing pixel values further comprises comparing captured image data of the first captured image to image data corresponding to each of the second captured image and the third captured image and incrementing and decrementing dependent on the comparison results.

8. The method as described in claim 7 wherein comparing further comprises comparing pixel values of the first captured image data to corresponding noise adjusted pixel values of each of the second captured image and the third captured image data, wherein the noise adjusted pixel value comprises the original pixel value plus a noise factor value.

9. The method as described in claim 4 wherein the display area is a projection screen and the image capture device is a digital camera.

10. A system comprising:
a computing system;
a display area controlled by the computing system to display a plurality of selected images within the display area;
an image capture device having an image capture area for capturing a plurality of images within the capture area each including one of the selected displayed images;
a display area locator for deriving constructive and destructive feedback data from image data corresponding to the plurality of captured images;
wherein displaying the plurality of selected images comprises displaying at least three images including, a first selected image having a first single intensity grayscale value $I_1$, displaying a second selected image having a second single intensity grayscale value $I_2$ and displaying a third selected image having a third single intensity grayscale value $I_3$, wherein $I_1>I_2>I_3$.

11. The system as described in claim 10 wherein the second single intensity grayscale value corresponds to one of a maximum intensity level and a minimum intensity level, the third single intensity grayscale value corresponds to the other of the maximum intensity level and the minimum intensity level, and the first single intensity grayscale value is a value between the maximum and minimum intensity values.

12. The system as described in claim 10 wherein the second selected image includes a first region having a corresponding intensity value $I_2$ and second region have a corresponding intensity value $I_3$ and the third selected image includes the first region having a corresponding intensity value $I_3$ and the second region have a corresponding intensity value $I_2$.

13. The system as described in claim 10 further comprising:

a means for storing an array of pixel values associated with the image data corresponding to a first captured image of the plurality of captured images, the first captured image including a first selected image of the plurality of selected images; and a means for one of incrementing and decrementing the pixel values dependent on the image data corresponding to the remainder of the plurality of captured images.

14. The system as described in claim 13 wherein the pixel values are incremented by a first predetermined constant value and the pixel values are decremented by a second predetermined constant value.

15. The system as described in claim 13 wherein pixel values corresponding to the display area within the capture area are incremented so as to create the constructive feedback data and pixel values not corresponding to the display area are decremented so as to create the destructive feedback data.

16. The system as described in claim 13 wherein the display area is a projection screen and the image capture device is a digital camera.

17. A apparatus for determining the location of a computer controlled display area within an image capture area of an image capture device comprising:

a means for storing image data corresponding to at least one of a plurality of captured images each captured image including one of a plurality of selected images displayed within the display;

a means for deriving constructive and destructive feedback data from the image data corresponding to the plurality of captured images;

wherein displaying the plurality of selected images comprises displaying at least three images including, a first selected image having a first single intensity grayscale value $I_1$, displaying a second selected image having a second single intensity grayscale value $I_2$ and displaying a third selected image having a third single intensity grayscale value $I_3$, wherein $I_1>I_2>I_3$.

18. The apparatus as described in claim 17 wherein the derivation means comprises:

a means for comparing stored image data corresponding to a first captured image of the plurality of captured images to second and third image data corresponding to each of second and third captured images of the plurality of captured images; and a means for one of incrementing and decrementing the stored image data dependent on the comparison of the image data.

* * * * *